United States Patent
Scantlin

[19]

[11] Patent Number: 6,155,284

[45] Date of Patent: Dec. 5, 2000

[54] BUCKLING PIN LATCH ACTUATED SAFETY RELIEF VALVE

[76] Inventor: Gary Scantlin, 1219 Taurus Dr., Edmond, Okla. 73003

[21] Appl. No.: 09/271,071

[22] Filed: Mar. 17, 1999

[51] Int. Cl.[7] .................................................. F16K 17/14
[52] U.S. Cl. ....................................... 137/70; 137/624.27
[58] Field of Search ................................. 137/70, 624.27

[56] References Cited

U.S. PATENT DOCUMENTS

| | | |
|---|---|---|
| 2,881,793 | 4/1959 | Lee . |
| 3,095,901 | 7/1963 | Larson . |
| 4,210,171 | 7/1980 | Rikuta . |
| 4,289,327 | 9/1981 | Okada . |
| 4,724,857 | 2/1988 | Taylor . |
| 4,776,365 | 10/1988 | Bathrick . |
| 4,787,409 | 11/1988 | Taylor . |
| 4,896,689 | 1/1990 | Taylor . |
| 4,896,690 | 1/1990 | Taylor . |
| 4,930,536 | 6/1990 | Taylor . |
| 4,977,918 | 12/1990 | Taylor . |
| 5,012,834 | 5/1991 | Taylor . |
| 5,067,511 | 11/1991 | Taylor . |
| 5,116,089 | 5/1992 | Taylor . |
| 5,146,942 | 9/1992 | Taylor . |
| 5,209,253 | 5/1993 | Taylor . |
| 5,226,442 | 7/1993 | Taylor . |
| 5,273,065 | 12/1993 | Taylor . |
| 5,297,575 | 3/1994 | Taylor . |
| 5,311,898 | 5/1994 | Taylor . |
| 5,318,060 | 6/1994 | Taylor . |
| 5,348,039 | 9/1994 | Taylor . |
| 5,373,864 | 12/1994 | Taylor . |
| 5,433,239 | 7/1995 | Taylor . |
| 5,575,306 | 11/1996 | Taylor . |
| 5,577,424 | 11/1996 | Taylor ....................................... 137/70 |
| 5,577,523 | 11/1996 | Taylor ....................................... 137/70 |
| 5,685,329 | 11/1997 | Taylor . |
| 5,706,848 | 1/1998 | Taylor . |
| 5,727,586 | 3/1998 | Taylor . |
| 5,836,337 | 11/1998 | Taylor ....................................... 137/70 |
| 5,860,442 | 1/1999 | Taylor . |
| 5,983,729 | 11/1999 | Taylor . |

*Primary Examiner*—Gregory L. Huson
*Assistant Examiner*—Ramesh Krishnamurthy
*Attorney, Agent, or Firm*—Gary Peterson

[57] ABSTRACT

The invention provides a method for using sacrificial buckling pin technology for a reliable actuated safety relief valve. The buckling pin fails at a predicted system pressure through transfer of force exerted by the system pressure on a sensing piston or diaphragm to the buckling pin. The buckling pin failure triggers the release of a latch mechanism that releases the actuator assembly to slide away from the valve seat to initiate relief flow. The use of the buckling pin as a trigger for release of a latch provides for valves with high flow rates without the use of large, unmanageable buckling pins.

12 Claims, 8 Drawing Sheets

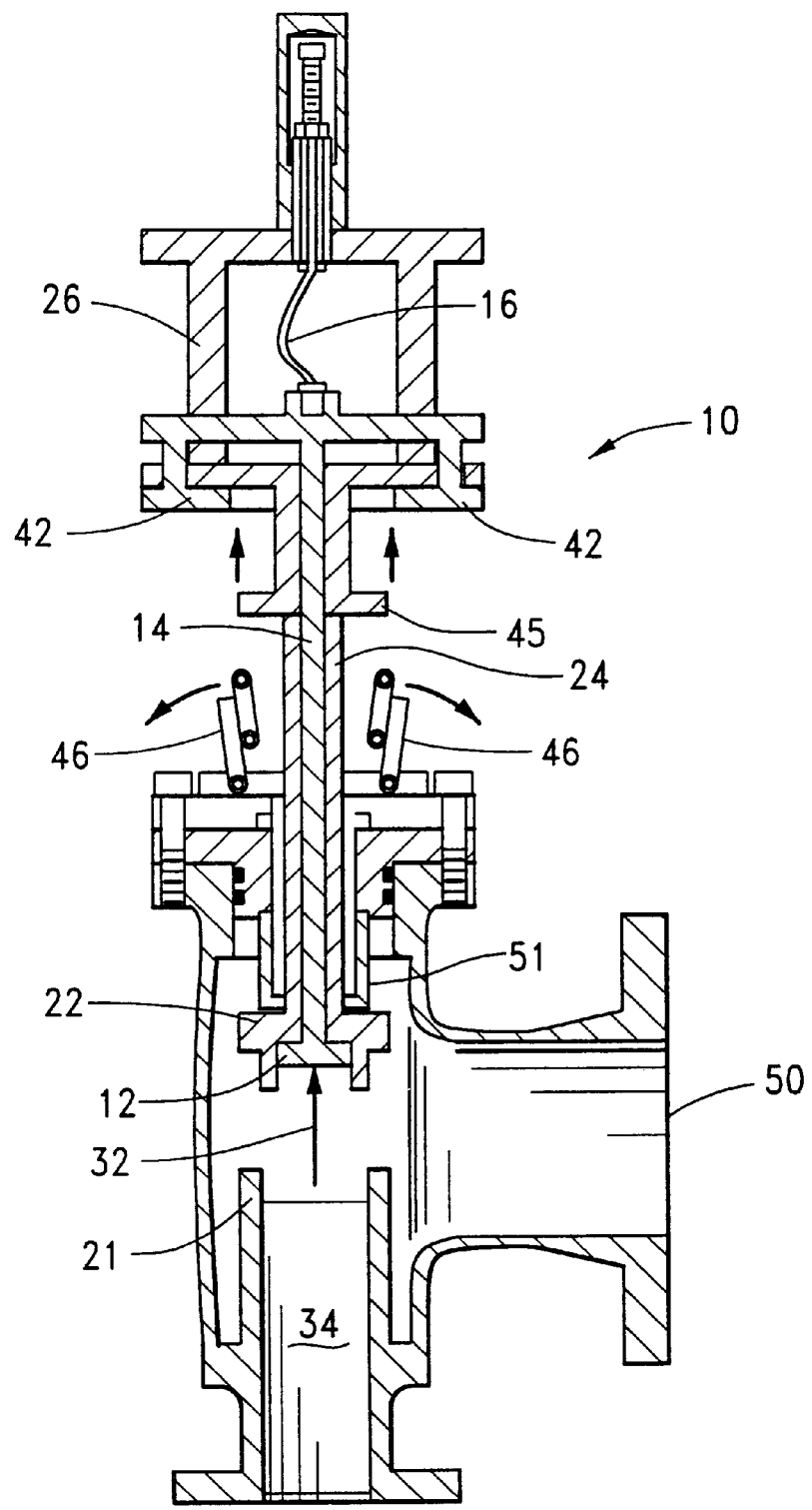

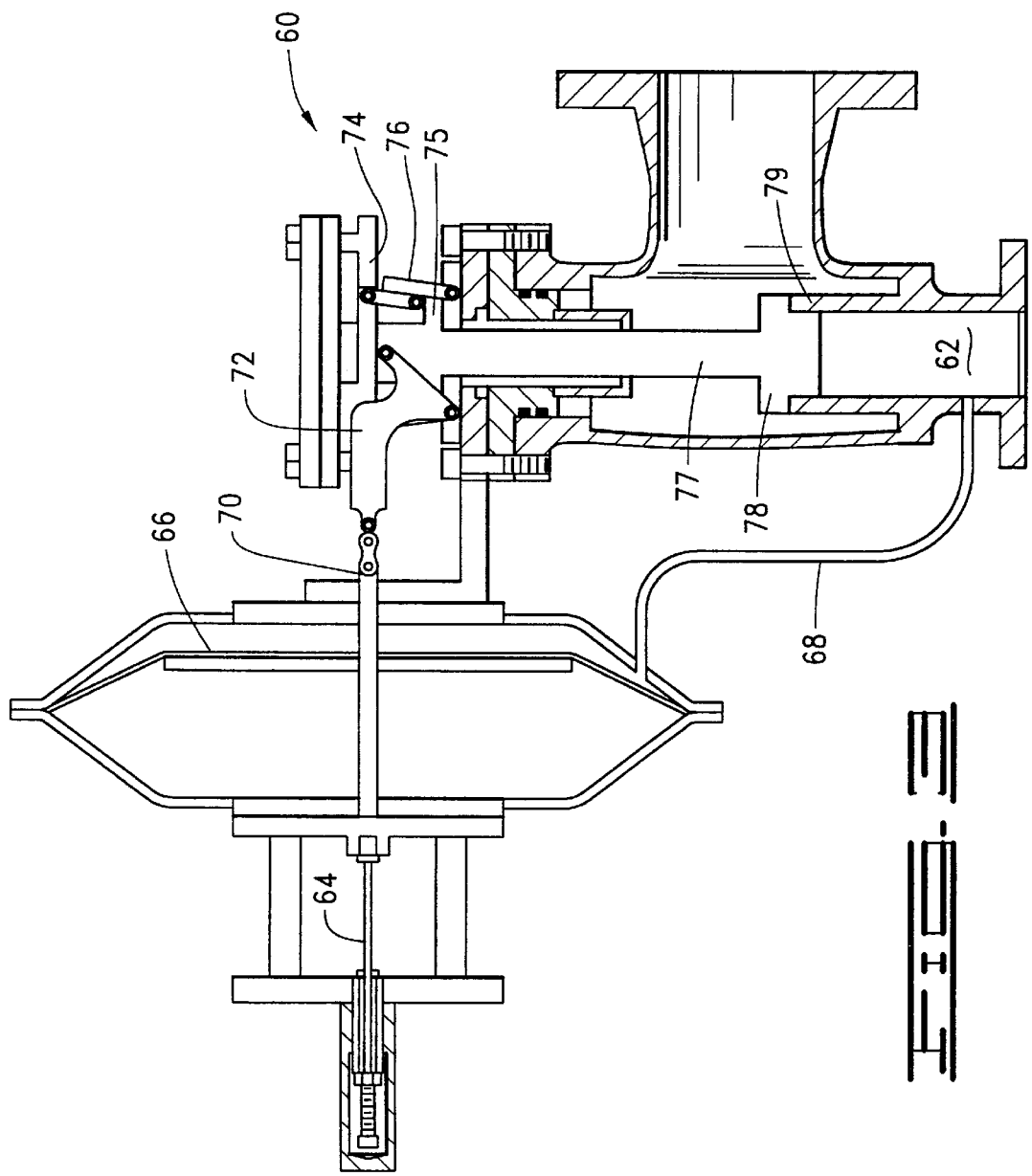

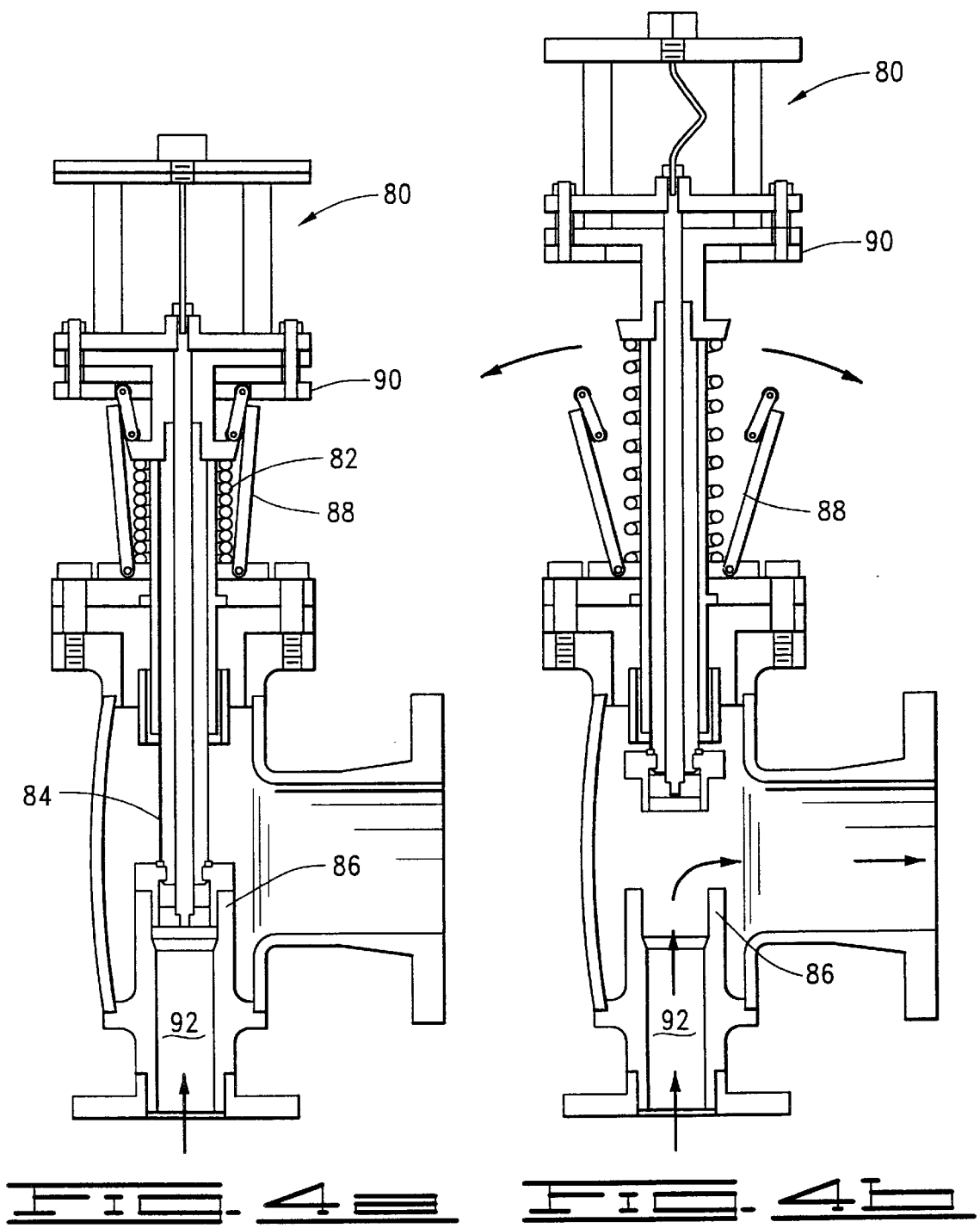

BUCKLING PIN LATCH ACTUATED SAFETY RELIEF VALVE

BACKGROUND OF THE INVENTION

1. Field of the Invention

The present invention relates to actuated safety relief valves. More specifically, the present invention relates to actuated relief valves that use a sacrificial buckling pin as a trigger for an actuator.

2. Background of the Related Art

The use of sacrificial buckling pins is widely known in the valve industry. Through the selection and use of appropriate materials, buckling pins can be designed to fail with a high degree of reliability and accuracy upon the application of a predictable axial compressive force. The maximum compressive load for a buckling pin is dependent on its slenderness, which is a function of the pin length and the diameter of its cross-section. For compressive axial failure, the ultimate compressive capacity of the pin is easily calculated using Euler's law. This principle does not apply if the buckling pin material is subject to an intervening mode of failure due to eccentric loading, material defects or yield stress limitations. The use of reasonably sized buckling pins is ideal for relief valve applications because of the simplicity of the device, the ease of replacement, low manufacturing, maintenance and upkeep costs, and the elimination of complicated electronic, pneumatic or spring mechanisms common in existing valve actuators.

The primary objective of safety relief valve designers is to obtain the maximum fluid flow capacity in order to relieve excessive system pressure. High flow capacities require a large orifice at the valve seat, especially in low pressure applications. In existing safety relief valves that use sacrificial buckling pins, the size of the valve orifice is directly determined by the physical displacement of the "active" or moving end of the buckling pin upon buckling failure. In other words, the physical collapse or "stroke" of the buckling pin directly determines the size of the orifice opened for relief flow. Consequently, the conventional use of buckling pins limits the relief capacity of the valve, requiring either redundant valves or excessively large valves in order to obtain the desired flow capacity.

The ultimate failure load of a buckling pin is more predictable if the length and size of the pin fall within a range of favorable slenderness ratios. With existing buckling pin designs, large valves or high pressure valves require a very long or large buckling pin, often resulting in a buckling pin that is of an awkward length or size for reliable prediction of buckling pin failure. Unfavorable slenderness ratios and intervening failure modes related to material yield stress, material defects or eccentric loading cause problems with buckling pin design and selection.

In safety relief valves, it is important to create a large orifice at the valve seat to quickly relieve system pressure by rapid removal of gas or liquid from the system. The required size of the orifice necessary depends on the available pressure differential across the valve, the desired flow rate and fluid properties. Generally, the smaller the stroke of the valve, the smaller the orifice made available for relief flow, the larger the valve must be in order to achieve its purpose.

FIGS. 1(a) and 1(b) show a prior art relief valve in closed and open positions, respectively. The prior art valve uses a buckling pin as a direct and stand alone actuator to oppose the full process pressure applied against a relief valve. In this relief valve, the stroke is determined by the difference in the original and failed buckling pin lengths. High flow capacities in existing buckling pin actuator valves are obtained only by increasing the length of the buckling pin in order to increase collapse displacement of the valve flapper, piston, plug or other actuated component. Longer collapse displacements required by large valves require longer, larger and more expensive buckling pins. Reliability and accuracy of predicted buckling pin failure loads are lost due to unfavorable slenderness ratios and the increasing intervention of other pin failure modes. Intervening failures related to material defects, material yield stress limitations and manufacturing irregularities may determine the ultimate load of the buckling pin.

Existing valves use mechanical linkages to mechanically reduce the force applied to the buckling pin in order to keep buckling pin slenderness ratios in the favorable range. Mechanical linkages using the lever arm principle provide a means of scaling the force applied to the linkage down to a manageable level. Inaccuracies and poor reliability result from wear or friction losses introduced by movable mechanical joints, all of which are magnified by the scaled mechanical advantage gained in the linkage, and result in an overall loss of valve accuracy and reliability. Therefore, there is a need for a simplified buckling pin actuated relief valve that avoids the problems of limited displacement, oversized buckling pins and inaccurate mechanical linkages. There is also a need for a durable, low maintenance buckling pin actuated safety relief valve that is easily reset and returned to service, and inexpensive to manufacture.

SUMMARY OF THE INVENTION

The present invention provides a buckling pin actuated safety relief valve having a calibrated buckling pin held within an actuator. The actuator includes a pressure sensing piston, a sensor stem, one or more latch arms, a primary stem, a piston cylinder, one or more pin arms and a latch mechanism. The piston is connected to the sensor stem, which is connected to the latch arms, forming a sensor assembly. Similarly, the piston cylinder is connected to the primary stem, which is connected to the pin arms, forming a seat assembly. The sensor assembly and the seat assembly, along with the buckling pin, form the actuator.

The pressure sensing face of the sensing piston is exposed to the system pressure being monitored. In the pressure monitoring mode, the piston transfers the force exerted by the system pressure on the sensing piston through the sensor stem to the end of the buckling pin. The buckling pin is held static by the equal and opposite resisting force applied to the opposite end of the buckling pin by the pin arms.

The pin arms are connected through the primary stem to the piston cylinder. The circumference of the piston cylinder seals at the seat in the valve. The piston cylinder is held firmly against the valve seat by a latch mechanism. The piston cylinder allows limited displacement of the sensing piston within the piston cylinder. The system pressure acting on the face of the sensing piston urges displacement of the sensing piston within the piston cylinder and places a force against the buckling pin. When the force exerted on the face of the sensing piston exceeds the compressive load bearing capacity of the buckling pin, buckling mode failure of the pin occurs, with simultaneous release and displacement of the latch arms relative to the latch mechanism. Displacement of the latch arms triggers the latch mechanism, releasing the primary stem and unseating the piston cylinder from the valve seat. The actuator is then further displaced, substantially without resistance, away from the seat by the system pressure thereby forming an orifice at the seat and initiating relief flow from the inlet to the outlet. Displacement of the actuator from the seat may be assisted by a spring or other biasing member or source of stored energy. The displacement of the actuator is preferably limited, but allows the piston cylinder and sensing piston to be sufficiently displaced to avoid restricting the flow through the orifice. The actuator just described can also be used to close the valve upon buckling pin failure against the system pressure in a "fail safe closed" application.

The flow capacity achieved by this valve design far exceeds the flow capacity that could be obtained by the limited displacement of the piston provided by the collapse of the buckling pin. Furthermore, the use of a latch mechanism with a buckling pin trigger affords the use of smaller less expensive and more accurate and reliable buckling pins while increasing valve flow capacity.

BRIEF DESCRIPTION OF THE DRAWINGS

So that the above recited features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

FIG. 3: is a low pressure buckling pin latch actuated valve shown in the closed position.

FIGS. 4(a) and (b): are buckling pin latch actuated valves with spring assisted opening shown in the closed and open positions, respectively.

FIG. 5: assembly view of the buckling pin latch actuated valve of the present invention.

FIG. 6: exploded view of the buckling pin latch actuated valve of the present invention. The buckling pin has been omitted from this view in order to permit better display of other elements.

DETAILED DESCRIPTION OF THE INVENTION

Figures 1A, 1B:
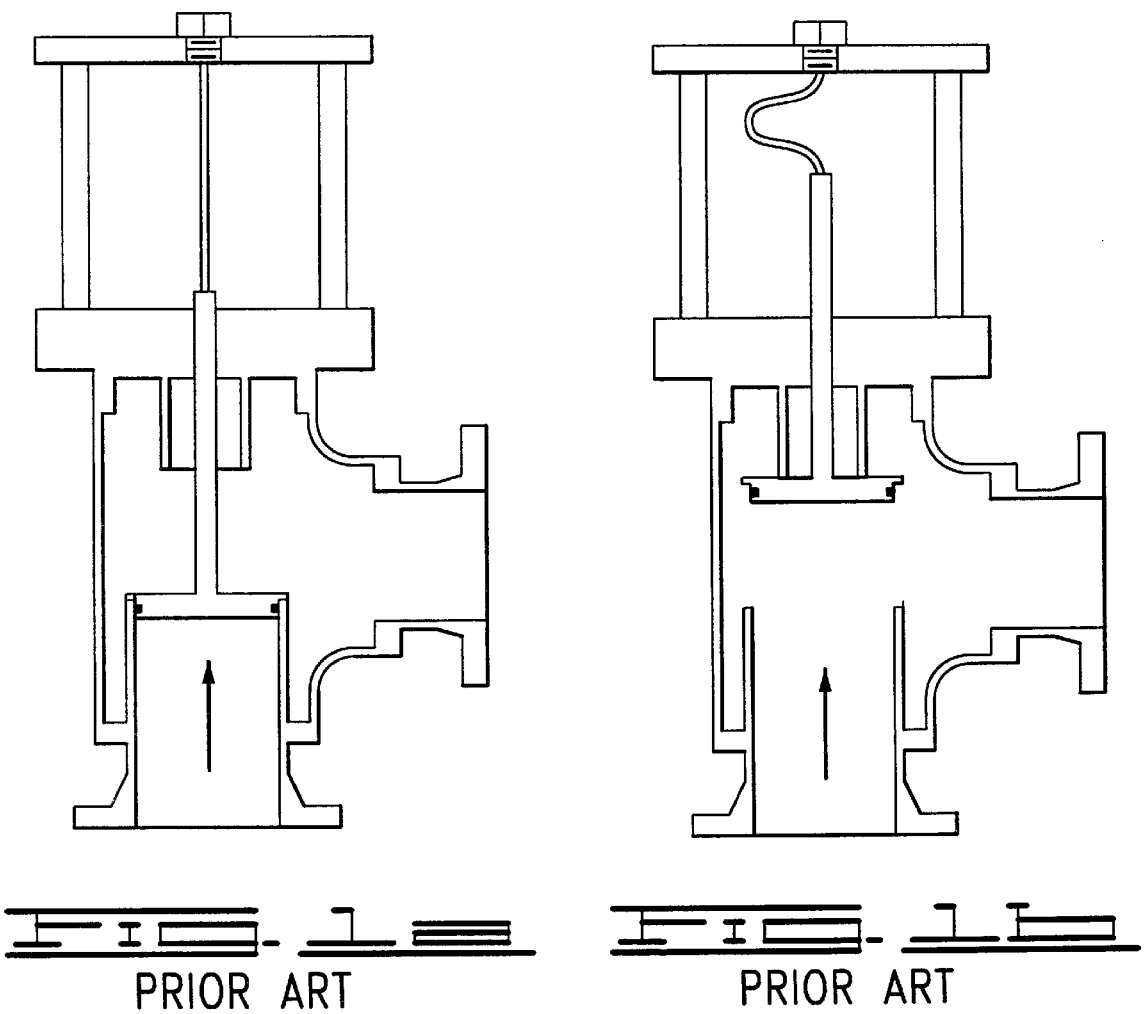
FIGS. 1(a) and (b): are "collapse displacement" valves in the prior art shown in the closed and open positions, respectively.

The present invention relates to a method and apparatus for using a buckling pin to release a latch mechanism that strokes a safety relief valve. The safety relief valve is exposed to the fluid pressure in a process vessel or stream and is actuated by pressures that exceed the set pressure of the relief valve.

One aspect of the invention provides a "fail safe closed" safety relief valve in which a force corresponding to the monitored system pressure is mechanically transferred to a buckling pin. When the monitored process pressure reaches the valve set pressure, sacrificial failure of the buckling pin occurs, thereby triggering an actuator latch release mechanism that allows the valve to open. The set pressure is determined by the cross-sectional area of a sensing member that transfers the process pressure against the buckling pin and the strength of the buckling pin itself. Buckling pin strength is in turn determined by the material and slenderness of the buckling pin.

Another aspect of the invention is a sensing member for a safety relief valve. The sensing member may be designed to have any desirable amount of surface area exposed to the process pressure. A small surface area sensing member, such as a piston, will transfer a smaller amount of force against the buckling pin, thereby allowing a smaller buckling pin to be utilized. A large surface area sensing member, such as a diaphragm, will transfer a larger amount of force against the buckling pin, thereby allowing the use of a larger buckling pin. In this manner, the choice of a buckling pin for any given set pressure is effected by the exposed area of the sensing member, and the two variables (buckling pin strength and exposed area) must be taken into account. This design provides for relief valves of different set pressures to use the same buckling pin but have different exposed surface areas of their sensing members. This provides the advantage of allowing maintenance crews to stock a fewer number of buckling pins for use in an unlimited number of safety valves having different set pressures. Further, this provides another advantage in that the buckling pins may be designed and chosen in a size that is well suited for reliability and accuracy of buckling mode failure, rather than simply by the magnitude of the buckling mode failure.

Another aspect of the invention is an actuator for a safety relief valve. The actuator includes a sensing member or sensing piston in cooperation with a separate piston cylinder or plug that engages the valve seat. The buckling mode failure of the buckling pin allows the sensing member to release a latch mechanism that otherwise holds the piston cylinder or plug seated against valve seat. Once the latch is released, the piston cylinder is pushed away from the seat by the process pressure. Preferably, the stroke of the piston cylinder is long enough that the actuated piston cylinder provides little or no resistance to fluid flow through the valve. The relief valve is reset by replacing the failed buckling pin with a new buckling pin.

Yet another aspect of the invention is a compact actuator for safety relief valve in which the sensing member is disposed concentrically with the piston cylinder. More particularly, the sensing member has a surface area that is only a portion of the surface area across the exposed face of the piston cylinder when it is seated in the valve. Therefore, while the sensing member is exposed to the pressure (i.e., force per unit area), the sensing member is subjected to less force than would the entire exposed face of the piston cylinder. The sensing member and the piston cylinder are coupled to the proximal end of two concentric shafts. The distal ends of the concentric shafts are coupled by the buckling pin in a manner to resist relative axial movement of the two concentric shafts, i.e., the buckling pin is at least parallel to the axis of the concentric shafts and preferably axially aligned with the concentric shafts. The shaft coupled to the sensing member also includes a latch retaining member, such as a shoulder, pin, etc., to releasably secure a latch mechanism or latch arm that maintains the piston cylinder in a seated position. The latch arm, which is preferably pivotally coupled to the valve body, is designed to release the piston cylinder upon movement of the latch retaining member during buckling mode failure of the buckling pin. When the piston cylinder is released, both the piston cylinder and the sensing member are slidably pushed away from the valve seat to allow pressure relief to the process fluid. This aspect of the invention is particularly desirable for use in high pressure processes.

Another aspect of the invention is particularly desirable for use in low pressure processes. The safety relief valve is provided with a diaphragm in fluid communication with the monitored process fluid and is exposed to the process pressure across the face of the diaphragm. The diaphragm applies a force against the buckling pin corresponding to the system pressure acting against the full area of the diaphragm. When the monitored system pressure reaches the valve set pressure, sacrificial failure of the buckling pin occurs and a latch mechanism securing the piston cylinder or valve plug is released from its positioned sealed against the valve seat. It should be recognized that many suitable mechanical latches and trigger mechanisms may be used to release the piston cylinder upon failure of the buckling pin and these mechanisms are considered to be within the scope of the present invention. Particularly, the present invention encompasses mechanical linkages that allow the buckling pin to be positioned in various relative positions between the piston cylinder and the sensing member so long as the buckling pin triggers the release of the piston cylinder or other valve sealing member, such as a gate, ball or needle.

FIG. 2(a) is a cross-sectional view of a safety relief valve 10 with a buckling pin 16 shown in a normal condition maintaining the valve in a closed, monitoring position. The buckling pin 16 is aligned with the sensing stem 14 that is joined to the pressure sensing piston (piston) 12. The buckling pin 16, sensing stem 14 and piston 12 make up the sensing assembly. The piston 12 reciprocates within a concentric piston cylinder (cylinder) 22 that is sealably connected to a tubular primary system (primary stem) 24 that is joined to arms or pins 26. A compressive force 32 corresponding to the system pressure 34 acting against the piston 12 is applied to the active end 15 of the buckling pin 16.

If the system pressure 34 is less than the set pressure of the valve, the pin arms 26 remain in place holding the static end 17 of the buckling pin 16 against the opposing compressive force applied to the active end 15 of the buckling pin. The force applied to the active end 15 of the buckling pin is determined by the magnitude of the system pressure 34 on the exposed face 11 of the piston 12. The magnitude of the force applied to the buckling pin 16 is equal to the system pressure times the cross-sectional area of the exposed face 11 of the piston 12 on a plane perpendicular to the axis of the sensing stem 14.

The latch fingers 46 hold the primary stem 24 in place with the cylinder 22 sealed against the valve seat (seat) 21. The sensing stem 14 is connected to two latch arms 42 that hold the latch fingers 46 in position against the latch collar 45. The latch collar 45 is connected to the primary stem 24 joined to the cylinder 22 and, when the cylinder 22 is secured against the seat 21 by the latch fingers 46, the valve remains in the closed position.

Figure 2:
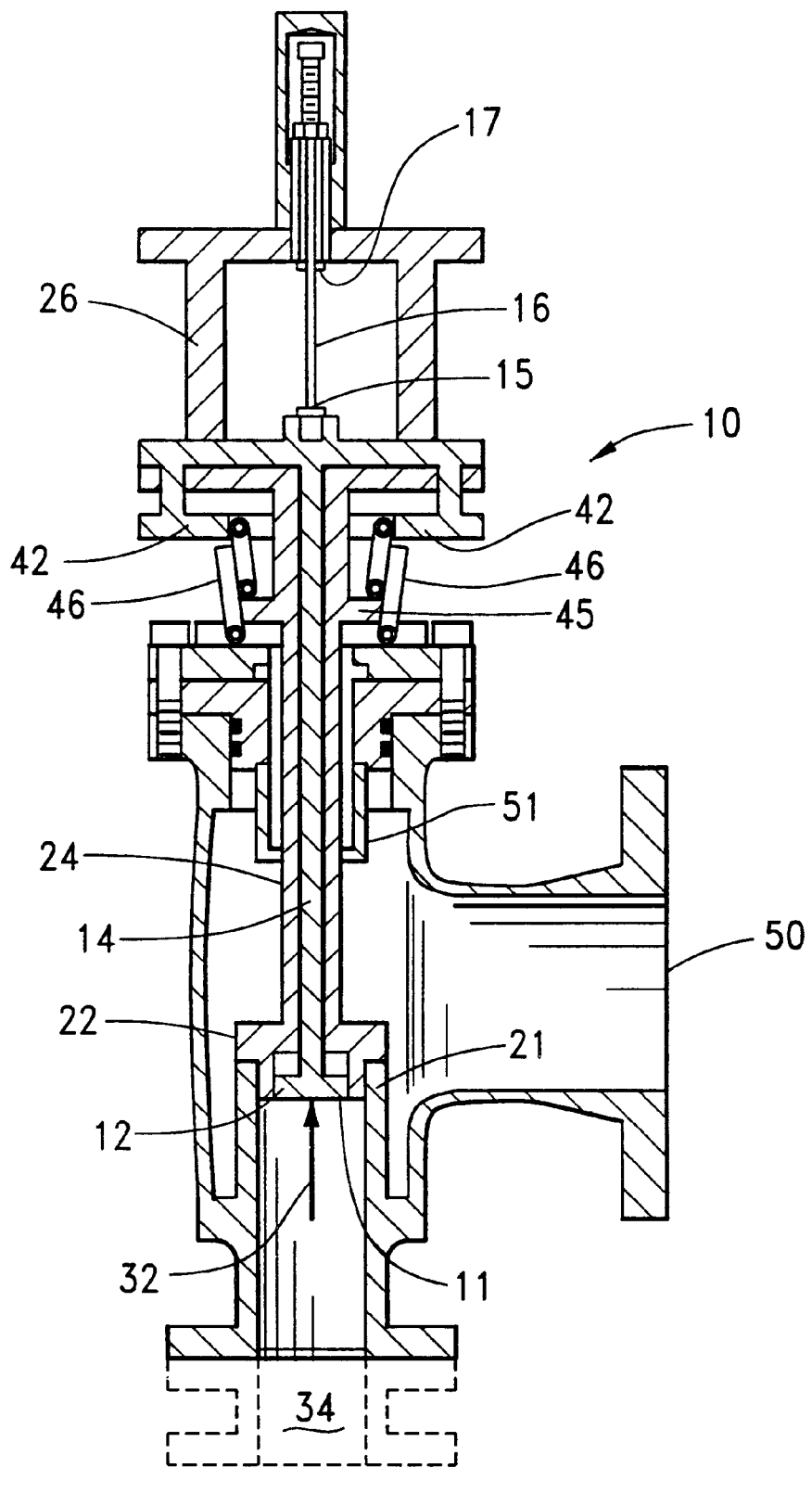
FIGS. 2(a), (b) and (c): are buckling pin latch actuated valves shown in the closed, intermediate and open positions, respectively.
Figure 2B:
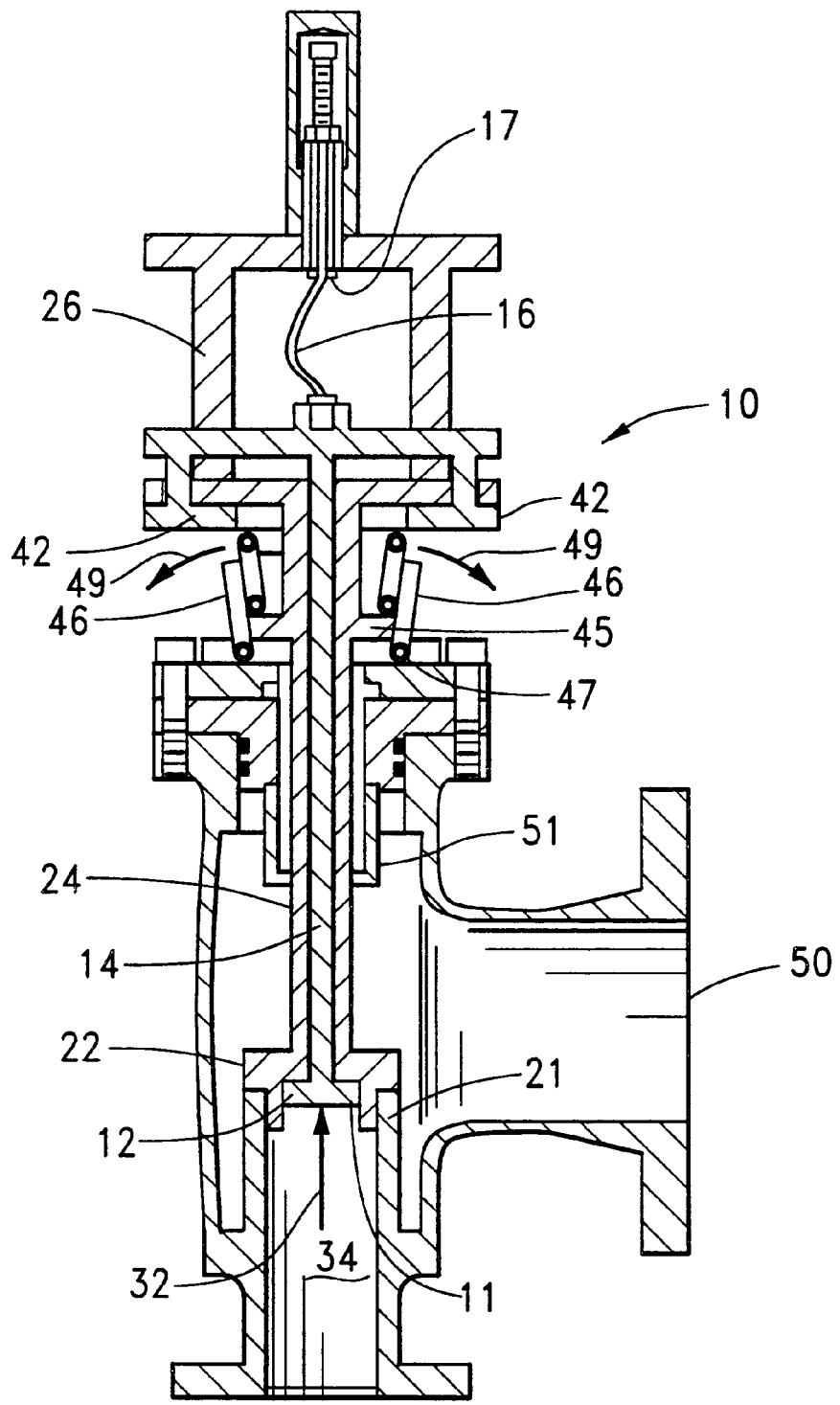
Figure 9:
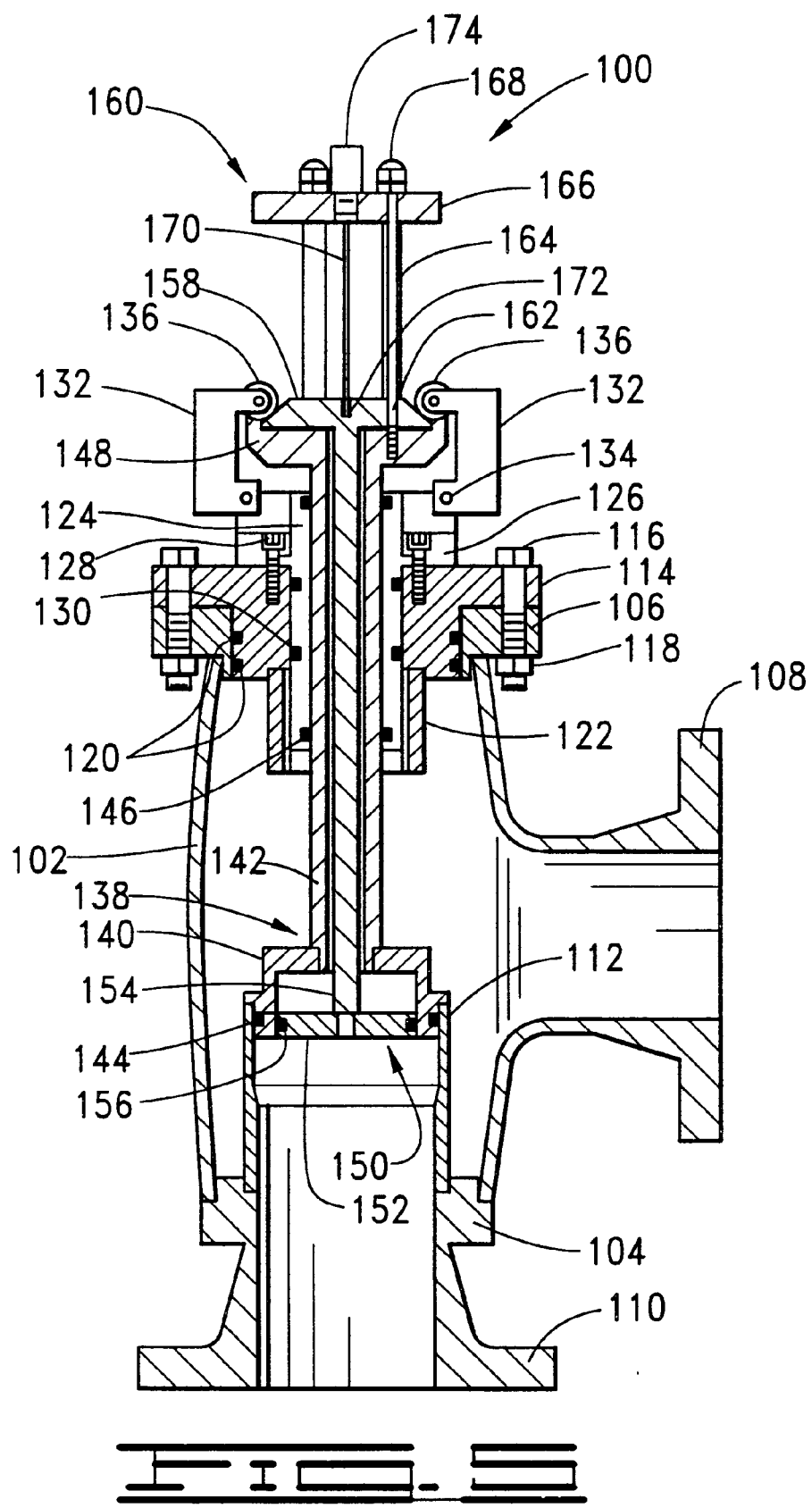
Figure 8:
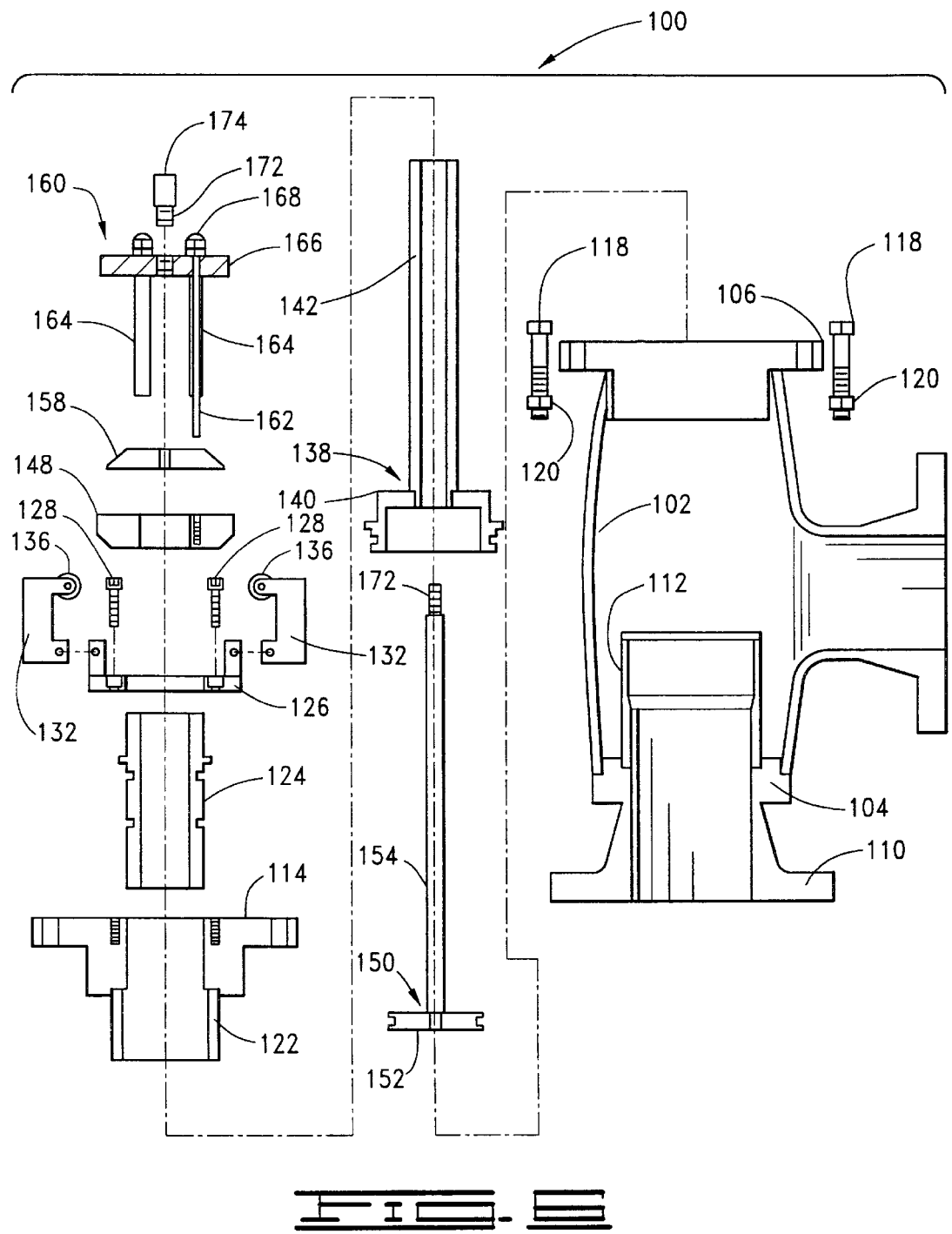

FIG. 2(b) shows the valve immediately after buckling failure of the buckling pin 16. The piston 12 has traveled toward the buckling pin 16 within the cylinder 22. Once the pin begins to buckle, the force required to completely collapse the buckling pin is substantially smaller than the force required to initiate buckling failure. These failure mechanics ensure full collapse of the buckling pin and corresponding full travel or stroke of the piston 12 within the piston cylinder 22.

Because the sensing piston 12 and stem 14 have traveled toward the buckled buckling pin 16, the latch arms 42 have become disengaged from the latch fingers 46, to release the latch collar 45 coupled to stem 24. The latch fingers are pivotally coupled to the valve body at pivot point 47 to ensure that the latch fingers 46 are displaced away from the latch collar 45 (as shown by arrows 49) under the force 32 placed on the primary stem 24. The latch mechanism is designed to avoid friction, mechanical losses and maintenance problems associated with mechanical linkages having a greater number of moving parts and components. The latch fingers may be mechanically biased to pivot outwardly to the latch release position shown in FIG. 2(c) using mechanical leverage or spring.

FIG. 2(c) shows the valve in the open position following failure of the buckling pin 16. The latch release allows the system pressure or other biasing member, such as a spring, to displace the actuator away from the seat, thereby opening an orifice at the seat and initiating relief flow through the valve and out the outlet 50. The travel of the actuator is preferably limited by a tubular stop 51 disposed to received the piston cylinder 22 in the fully open position. In the open position, the valve allows excessive process pressure to be relieved by the resulting removal of fluid from the system. The safety relief valve will remain open, or at least unlatched, until a new sacrificial buckling pin is installed and the valve is reset to the closed position.

FIG. 3 is a sectional view of an alternative relief valve assembly 60 for use in low pressure systems. This embodiment does not use a sensor stem to transfer system pressure 62 to the buckling pin 64, but instead uses a diaphragm 66 in fluid communication through a pilot tube 68 with the process pressure 62. The diaphragm 66 applies a force upon the buckling pin 64 that corresponds to the process pressure 62 being monitored by the relief valve 60 times the exposed area of the diaphragm 66. Upon collapse of the buckling pin 64, the secondary stem 70 moves toward the buckling pin (to the left in FIG. 3), and, through a mechanical linkage 72, causes the latch arms 74 to move away from and release the latch fingers 76 which, in turn, release the latch collar 75 and the primary stem 77. Having been released, the piston 78, the piston cylinder 22 is unseated and travels along with the primary stem 77 away from the seat 79 creating an orifice at the seat 79.

FIGS. 4(a and b) are simplified schematic views of a valve 80, similar in construction to the valve shown in FIGS. 2(a and c). respectively, modified to include a spring assisted actuator. In FIG. 4(a), the spring 82 is compressed to maintain a force urging the primary stem 84 of the actuator in the direction away from the seat 86 and against the latch fingers 88 holding the latch collar 90. In FIG. 4(b), upon release of the latch collar 90 of the actuator, the spring 82 pushes the valve open by displacing the actuator away from the seat 86. This modification can be used to perform valve closure unassisted by the system pressure 92 or against the system pressure 92 in a fail safe closed application.

FIGS. 5 and 6 show somewhat more detailed assembly and exploded views of a safety relief valve 100 of the present invention. The safety relief valve 100 is characterized by a hollow body 102 in which is formed from an upper end flange 104 and a lower end flange 106. Intermediate the upper and lower end flanges 104 and 106 is an outlet flange 108. The lower end flange 104 is interconnected to an inlet flange 110. A hollow seat tube 112 is supported on the lower end flange 104 and extends within the body 102.

A bonnet 114 is secured to the outer side of the upper end flange 106, and extends through the upper end flange 106 and into the body 102. The bonnet 114 is secured to the upper end flange 106 by bonnet hex nuts 116 and bonnet hex bolts 118. Bonnet seals 120 maintain a seal between the bonnet 114 and the upper end flange 106. A stop tube 122 is secured to the inner side of the bonnet 114, and extends within the body 102.

A tubular bushing 120 is received within the bonnet 114, and is held in position by a bushing retainer 126 which is secured to the bonnet 114 by retainer bolts 128. Bushing seals 130 maintain a seal between the busing 120 and the bonnet 114.

The main piston assembly 138 comprises a main piston 140 and a main piston stem 142 extending therefrom. The main piston assembly 130 extends within the body 102 through the upper end flange 106, bonnet 114 and bushing 124, such that the main piston 140 is seatable on the seat tube 112. Main piston seal 144 maintains a sealed relationship between the main piston 140 and the seat tube 122. Stem seal 146 maintains a sealed relationship between the main piston stem 142 and the bushing 124. Supported on the end of the main piston stem 142 opposite the main piston 140 is a latch platform 148.

The sensor piston assembly 150 comprises a sensor piston 152 and a sensor piston stem 154 extending therefrom. The sensor piston assembly 150 extends within the body 102, such that the sensor piston stem is received within the main piston stem 142 and the sensor piston 152 is received within the main piston 140. Sensor piston seal 156 maintains a sealed relationship between the sensor piston 152 and the main piston 140. Supported on the end of the sensor piston stem 154 opposite the sensor piston 142 is a sensor platform shoe 158.

Latch fingers 132 are pivotably mounted on the bushing retainer 126 by means of latch pins 134. Formed adjacent the end of each latch finger 132 is a latch roller 136 which rollingly engages the sensor piston shoe 158.

Supported on the latch platform 148 is a pin cage assembly 160. The pin cage assembly 160 comprises a top plate 166 which is maintained in a spaced position from the latch platform 148 by spacers 164. A spacer 164 is held in a fixed position by a cage post 162 extending therethrough. The cage post 162 extends through the top plate 166 at its upper end, and is threaded into the upper surface of the latch platform 148 at its lower end. The upper end of the cage post is secured to the top plate 166 by an acorn nut 168.

A buckling pin 170 is received within the pin cage assembly and is held in position at its opposite ends by pin inserts 172. The lower pin insert 172 is formed in the upper end of the sensor piston stem 154, while the upper pin insert 172 is disposed within the top plate 166, and held in position by a retainer nut 174.

While the foregoing is directed to the preferred embodiment of the present invention, other and further embodiments of the invention may be devised without departing from the basic scope thereof, and the scope thereof is determined by the claims which follow.

What is claimed is:

1. A relief valve, comprising:
   (a) a body having at least one fluid inlet port communicating through a valve seat to at least one fluid outlet port;
   (b) a primary piston assembly having a piston cylinder, a primary stem having an exterior surface and at least one pin arm;
   (c) a latch releasably engaging the exterior surface of the primary stem and releasably securing the piston cylinder in engagement with the valve seat;
   (d) a sensor assembly for monitoring system pressure having a sensing member, a sensing stem and at least one latch arm, wherein the sensing member is in fluid communication with the fluid inlet port and the latch arms releasably secure the latch against the primary stem; and
   (e) at least one buckling pin coupled to the sensor assembly to oppose forces placed on the sensing member wherein failure of the buckling pin causes the latch arms to release the latch allowing the primary piston assembly to disengage from the valve seat which provides fluid communication between the fluid inlet ports and the fluid outlet ports.

2. The relief valve of claim 1, further comprising a biasing member urging the seat assembly away from the valve seat.

3. The relief valve of claim 1, wherein the latch arms define a cage.

4. The relief valve of claim 1, wherein the pin arms define a cage.

5. The relief valve of claim 1, wherein the sensing member is a sensing piston disposed within the piston cylinder.

6. The relief valve of claim 5, wherein the primary stem is concentrically disposed around the sensing stem.

7. The relief valve of claim 1, wherein the one or more buckling pins are coupled between the seat assembly and the sensor assembly.

8. The relief valve of claim 1, wherein the sensing member is a diaphragm in fluid communication with the fluid inlet port through a conduit.

9. The relief valve of claim 8, wherein the diaphragm has a surface area in fluid communication with the fluid inlet port that is greater than the cross-sectional area of an orifice defined by the valve seat.

10. The relief valve of claim 1 wherein the valve is a fail safe closed safety relief valve wherein the sensor assembly is set to so that upon reaching a desired system pressure sacrificial failure of the buckling pin occurs, thereby triggering the latch to open the valve.

11. A relief valve, comprising:
   (a) a body having at least one fluid inlet port communicating through a valve seat to at least one fluid outlet port;
   (b) a primary piston assembly having a piston cylinder, a primary stem, having a first end coupled to the piston cylinder and an opposed second end, and at least one pin arm;
   (c) a latch releasably securing the piston cylinder in engagement with the valve seat;
   (d) a sensor assembly for monitoring system pressure having a sensing member received concentrically within the piston cylinder, a sensing stem disposed concentrically within the primary stem and having a first end coupled to the sensing member and an opposed second end, and at least one latch arm, wherein the sensing member is in fluid communication with the fluid inlet port and the latch arms releasably secure the latch against the primary stem;
   (e) at least one buckling pin coupled to the sensor assembly to oppose forces placed on the sensing member wherein failure of the buckling pin causes the latch arms to release the latch allowing the seat assembly to disengage from the valve seat which provides fluid communication between the fluid inlet ports and the fluid outlet ports; and
   (f) wherein the second ends of the concentric stems are coupled to the buckling pin in a manner to resist relative axial movement of the two concentric stems, and wherein the latch maintains the piston cylinder in a seated position until desired system pressure whereupon the sacrificial failure of the buckling pin releases the piston cylinder upon movement of the latch where upon both the piston cylinder and the sensing member are slidably pushed away from the valve seat by system pressure to allow pressure relief to the process fluid.

12. A method of actuating a process pressure relief valve, comprising:

securing a piston cylinder which is coupled to a primary stem against a valve seat with a latch;

biasing the latch to disengage the piston;

releasably securing the biased latch in engagement with the piston by engaging the exterior surface of the primary stem with a latch arm of a sensing member;

exposing the sensing member to the process pressure;

transmitting forces applied to the sensing member to compress a buckling pin;

allowing the buckling pin to buckle when the process pressure exceed a set pressure;

displacing the sensing member and latch arm as the buckling pin buckles to release the latch from the piston cylinder; and displacing the unlatched piston cylinder away from the valve seat.

* * * * *